(12) United States Patent
Ginocchio

(10) Patent No.: US 7,900,324 B2
(45) Date of Patent: Mar. 8, 2011

(54) SELF-ALIGNING HANDLING OR STORING DEVICE HAVING SIDE OR TOP ACTUATION AND METHODS OF USE THEREFOR

(76) Inventor: Mak H. Ginocchio, St. Petersburg Beach, FL (US)

( * ) Notice: Subject to any disclaimer, the term of this patent is extended or adjusted under 35 U.S.C. 154(b) by 0 days.

(21) Appl. No.: 12/038,514

(22) Filed: Feb. 27, 2008

(65) Prior Publication Data

US 2009/0211063 A1    Aug. 27, 2009

(51) Int. Cl.
*E05B 75/00* (2006.01)
(52) U.S. Cl. .......................... 24/272; 24/30.5 R; 70/16
(58) Field of Classification Search .................. 24/16 R, 24/30.5 R, 16 PB, 505, 506, 517, 518, 542–544
See application file for complete search history.

(56) References Cited

U.S. PATENT DOCUMENTS

| | | | | |
|---|---|---|---|---|
| 151,452 | A | * | 5/1874 | Tower ................................ 70/16 |
| RE7,873 | E | * | 9/1877 | Phelps ............................. 70/16 |
| 200,950 | A | * | 3/1878 | Tower ................................ 70/16 |
| 222,751 | A | * | 12/1879 | Tower ................................ 70/16 |
| 470,869 | A | * | 3/1892 | Kahlee ............................. 70/16 |
| 636,589 | A | * | 11/1899 | Tower ................................ 70/16 |
| 686,626 | A | * | 11/1901 | Maltby ............................. 70/16 |
| 732,417 | A | * | 6/1903 | Judd ................................. 70/16 |
| 766,263 | A | * | 8/1904 | Judd ................................. 70/16 |
| 772,468 | A | * | 10/1904 | Maltby ............................. 70/16 |
| 827,385 | A | * | 7/1906 | Olcott .............................. 70/16 |
| 870,871 | A | * | 11/1907 | Eggleton .......................... 70/16 |
| 929,910 | A | * | 8/1909 | Wood ............................... 70/16 |
| 930,014 | A | * | 8/1909 | Wood ............................... 70/16 |
| 948,310 | A | * | 2/1910 | Caveney ........................... 70/16 |
| 985,560 | A | * | 2/1911 | Widmayer ........................ 70/16 |
| 1,000,666 | A | * | 8/1911 | Caveney ........................... 70/16 |
| 1,014,118 | A | * | 1/1912 | Carberry .......................... 70/16 |
| 1,038,492 | A | * | 9/1912 | Lorey ............................... 70/16 |
| 3,146,614 | A | * | 9/1964 | Von Frantzius .................. 70/16 |
| 3,310,852 | A | | 3/1967 | Flanders | |
| 3,429,985 | A | | 2/1969 | Czigler | |
| 3,530,543 | A | | 9/1970 | Desmarais et al. | |
| 3,574,900 | A | | 4/1971 | Emery | |
| 3,654,668 | A | | 4/1972 | Appleton | |
| 3,660,869 | A | | 5/1972 | Caveney et al. | |
| 3,910,280 | A | | 10/1975 | Talonn | |
| 3,913,187 | A | | 10/1975 | Okuda | |
| 3,953,911 | A | | 5/1976 | Fishack | |
| 4,123,095 | A | | 10/1978 | Stehlin | |

(Continued)

OTHER PUBLICATIONS

Sumitomo Wiring System, Ltd., Binding Tool for Wire Harness, Patent Abstracts of Japan, Publication No. 07122135, Oct. 21, 1993.

(Continued)

*Primary Examiner* — Jack W. Lavinder
(74) *Attorney, Agent, or Firm* — Wood, Herron & Evans, LLP

(57) ABSTRACT

A device for handling or storing items uses jaw members that hinge to one of several closed positions in which the inner surface of a first jaw is engaged by an engagement device of the second jaw. An external release member in the second jaw is used to move the engagement device between an engaging and a disengaged position. The second jaw also incorporates a retaining surface, positioned opposite the outer surface of the first jaw when the jaws are closed, which opposes outward flexing of said first jaw member, and thus reduces the opportunity for disengagement due to forces from inside the jaws.

14 Claims, 11 Drawing Sheets

U.S. PATENT DOCUMENTS

| | | | |
|---|---|---|---|
| 4,278,042 A | 7/1981 | Lindquist | |
| 4,340,998 A | 7/1982 | Liberge | |
| 4,361,938 A | 12/1982 | Emery | |
| 4,380,101 A | 4/1983 | Joubert et al. | |
| 4,478,381 A | 10/1984 | Pittion et al. | |
| 4,483,556 A | 11/1984 | Livolsi | |
| 4,511,164 A | 4/1985 | Orchard | |
| 4,650,925 A | 3/1987 | Coldren | |
| 4,669,688 A | 6/1987 | Itoh et al. | |
| 4,870,722 A | 10/1989 | Shell, Jr. | |
| 4,956,897 A | 9/1990 | Speedie | |
| 4,958,791 A | 9/1990 | Nakamura | |
| 4,991,265 A | 2/1991 | Campbell et al. | |
| 5,056,248 A | 10/1991 | Blanchard | |
| 5,083,741 A | 1/1992 | Sancoff | |
| 5,210,911 A | 5/1993 | Brown et al. | |
| 5,228,174 A | 7/1993 | Beasley | |
| 5,317,788 A | 6/1994 | Esposito et al. | |
| 5,349,779 A | 9/1994 | Ben-Dror | |
| 5,377,510 A * | 1/1995 | Smith | 70/16 |
| 5,729,872 A | 3/1998 | Ginocchio | |
| 5,794,461 A * | 8/1998 | Smith | 70/16 |
| 6,101,684 A * | 8/2000 | Ginocchio | 24/16 R |
| 6,196,033 B1 * | 3/2001 | Dowdle | 70/16 |
| 6,619,077 B1 * | 9/2003 | Robinson | 70/16 |
| 6,742,223 B1 | 6/2004 | Chang | |
| 7,143,480 B2 | 12/2006 | Igarashi | |

OTHER PUBLICATIONS

Photograph, White Cable Clamp.
Photograph, Rowland Clip.
Photograph of Toy Handcuff.
Photograph Gray Cable Clamp.
Sumitomo Wiring System, Ltd., Binding Tool for Wire Harness, Patent Abstracts of Japan, Pub. No. 07122135, Oct. 21, 1993.
Image of Howland Clip.
Image of White Clamp.
Image of Gray Clip.
Image of Toy Handcuffs.

\* cited by examiner

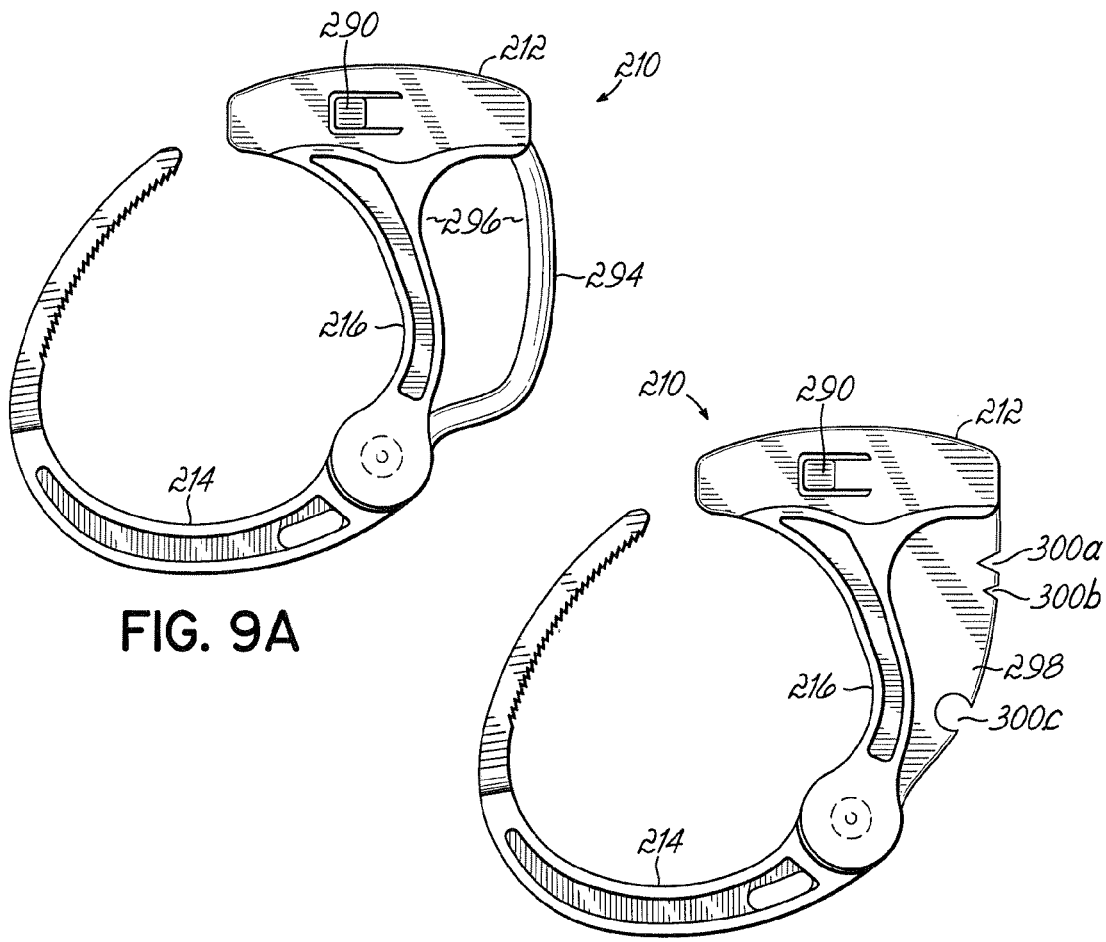
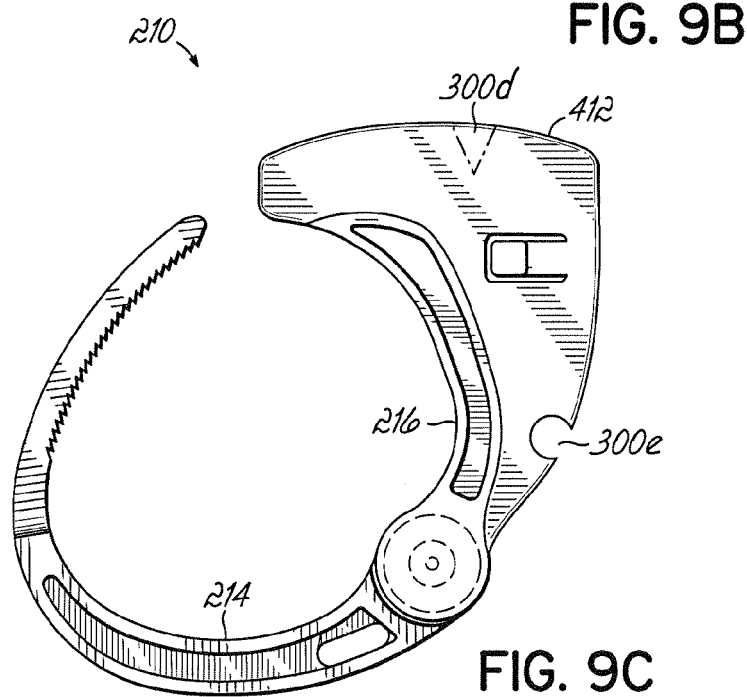
FIG. 9A
FIG. 9B
FIG. 9C

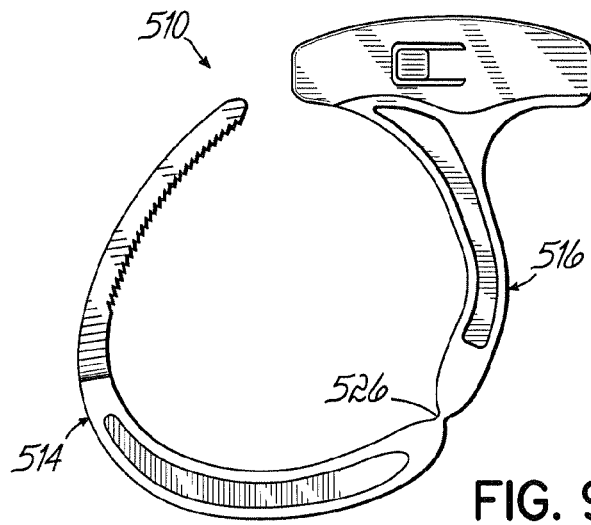
FIG. 9D
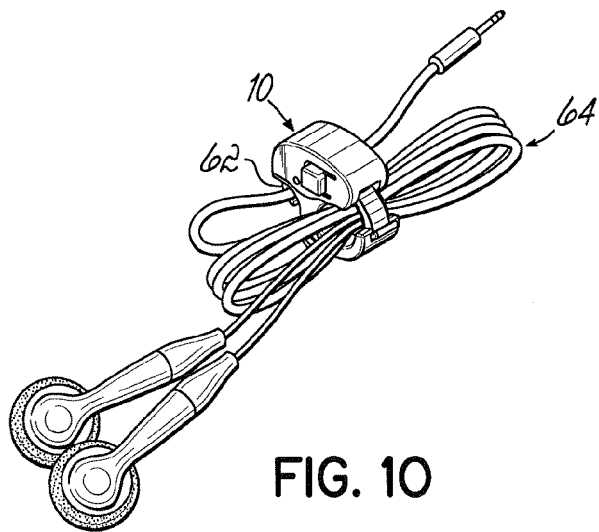
FIG. 10
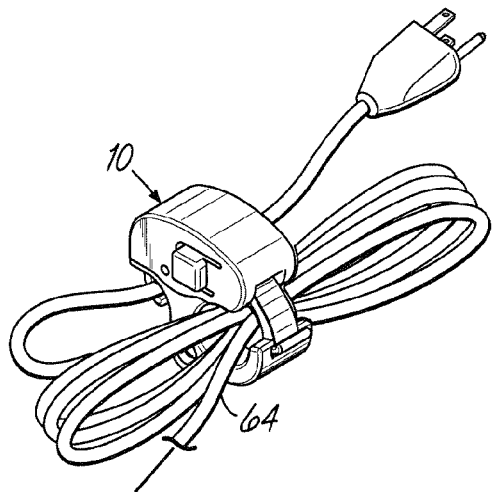
FIG. 11
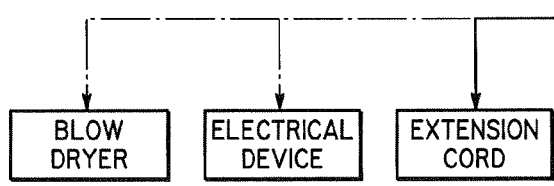

ically use of such devices. Typically, a twist tie or wire tie is
SELF-ALIGNING HANDLING OR STORING DEVICE HAVING SIDE OR TOP ACTUATION AND METHODS OF USE THEREFOR

CROSS REFERENCE

This application is related to U.S. Pat. Nos. 5,729,872 and 6,101,684, each naming the same inventor as the present application, which are hereby incorporated by reference in their entireties.

TECHNICAL FIELD

The present invention relates to devices for capturing items, such as for handling or storage of electrical cords or cables or other applications.

BACKGROUND

Handling and/or storage of items has presented numerous challenges, and despite the various handling and storage devices that have been devised, several problems continue to be difficult to resolve.

One example is the problem of storage of electrical cords or cables. Many people tend to leave their cords simply in a pile. Such an approach is unsightly and can be unsafe. Indeed, without better organization of the cords, storage can become a nightmare. One need only consider the PC laptop user trying to untangle the mess of cables from the briefcase in a busy airport.

Typically, wire-ties, tie wraps, cable ties, or twist-ties may be used to store cords in an effort to reduce such problems. However, such items are very difficult to use and require a great deal of manual dexterity. In particular, closing these ties around the bundled cord is quite challenging because the ends are free to go wherever they are pushed. Some of those items, and particularly twist-ties such as are used to close garbage bags, are unsightly, have only a short useful life, and can present a risk of injury due to the metal wire contained therein. Other cable management devices have been proposed, but they are usually quite bulky and again require a great deal of manipulation. By way of example, some cable management devices are molded into a split ring with the ends normally urged together. The ends may be temporarily held apart by the user while a cable is inserted into the device. Such a device is difficult to load with the bundled wire because the ends are normally urged together into a closed or nearly-closed position. The ends may be temporarily held apart by the user while a cable is inserted into the device. Such a device is difficult to load with the bundled wire because the ends are normally urged together into a closed or nearly-closed position.

When not attached to a cable or wire, a small wire tie or similar device is easy to lose. Also, such devices are typically designed for limited use, e.g., they cannot be non-destructively removed, or will experience substantial wear (e.g., metal fatigue) if repeatedly opened and closed. Thus, one cannot avoid losing a twist tie or wire tie by attaching it to the unbundled cable, since doing so will require destruction or damage to the twist tie or wire tie. This is a particular drawback in storage of cables which must be repeatedly bundled and unbundled, e.g., extension cords used with hand tools, portable computer cabling, and other similar applications.

Aside from bundles of wires, in various other situations, objects must be wrapped and held for storage, handling or other reasons; often wire ties, twist ties, or lengths of string are used in such situation, with unsatisfactory results for the same reasons as those noted above: difficulty in use, likelihood of loss, and destruction and wear resulting from repeated use.

Recent patents by the present inventor, U.S. Pat. Nos. 5,729,872 and 6,101,684, which are hereby incorporated by reference in their entirety, have improved upon the situation described above by introducing handcuff-like elements having a pair of jaws that can self-sustain an open position while a bundled item is inserted, and then the jaws follow a fixed path or trajectory to close and latch around the bundled item. These devices are unlatched by generally pulling against a force generated by a living hinge or spring that keeps the two jaws engaged at their latching ends. This pulling action can be difficult and inconvenient depending upon the orientation, size, and location of the bundle. The person using the existing devices may have to locate and orient their bundles in a way that can accommodate the needed access for unlatching even though they would prefer a different orientation or location.

Accordingly, there is a need for a device that can be released with a different motion and/or direction than is currently available without suffering the drawbacks noted above.

There is also a need for a device that is usable on a very small bundle, such as the wires leading to ear buds for portable entertainment devices. Ear buds, need only use a very small device since ear buds use a very thin wire. Devices such as those of U.S. Pat. Nos. 5,729,872 and 6,101,684 could benefit the user of ear buds if they could be made in very small sizes, but their unlatching actions tend to limit how small they can go and still be easily used by the human hand. Therefor, a different unlatching action, able to be used when incorporated into a small device, is a desirable improvement.

SUMMARY

In one aspect, the invention features a device for handling or storing items using jaw members that hinge to one of several closed positions, in which the inner surface of one jaw is engaged by an engagement device of the other, and an external release member is used to move the engagement device between an engaging and a disengaged position.

In another aspect, the invention features a device with hinged jaws in which the inner surface of a first jaw is engaged by an engagement device of the second jaw, in which the second jaw also incorporates a retaining surface, positioned opposite the outer surface of the first jaw when the jaws are closed, which opposes outward flexing of said first jaw member, and thus reduces the opportunity for disengagement due to forces from inside the jaws.

The detailed embodiments disclosed herein include a number of specific features, which although not necessary to the inventive aspects, may facilitate the implementation thereof. For example, teeth may be used in the inner engagement surface and the engagement device. A moveable member and cam may be used in the engagement device, the moveable member being actuated from the outside to move internal members of the engagement device and disengage the jaws. Handles, hooks or wedges of V- or C-shaped section, other may be incorporated in either jaw to aid in the use of the device. Also, the device may itself be incorporated into another device to increase availability. Finally, the jaw members may be hingedly connected in any number of ways, including the use of a hinge strap.

These and other features, objects and advantages of the invention will become more readily apparent to those skilled in the art in view of the following detailed description, taken in conjunction with the accompanying drawings.

BRIEF DESCRIPTION OF THE FIGURES

The accompanying drawings, which are incorporated in and constitute a part of this specification, illustrate embodiments of the invention and, together with a general description of the invention given above, and the detailed description given below, serve to explain the principles of the invention.

FIG. 9A is an elevational view of an embodiment with an open surface handle.

FIG. 9B is an elevational view of an embodiment with a closed surface handle.

FIG. 9C is an embodiment with a closed surface handle with side buttons at the handle area.

FIG. 9D is an elevational view of an embodiment with a hinge strap, sometimes known as a "living hinge".

FIG. 10 is a perspective view of an embodiment clipped to a set of ear buds and bundling them.

FIG. 11 is a perspective view of an embodiment clipped to an extension cord, and alternately a blow dryer or another electrical device.

DETAILED DESCRIPTION

Figure 1:
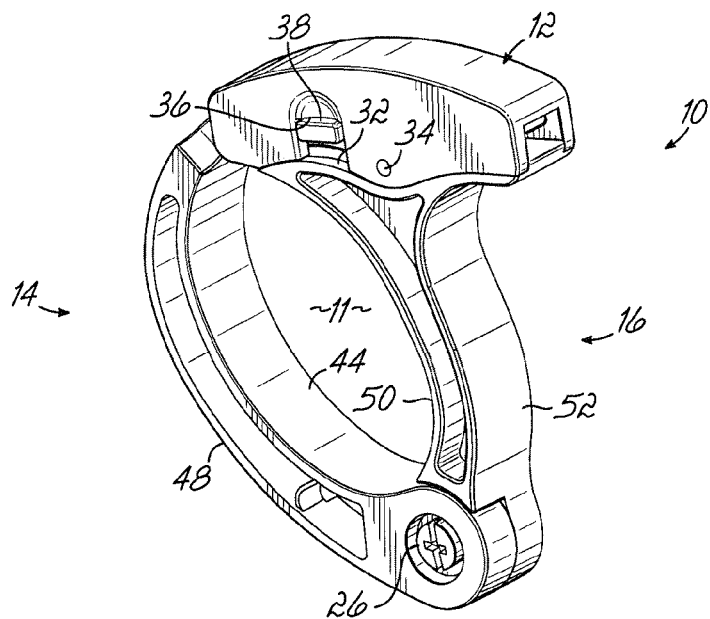
FIG. 1 is a perspective view of one of the embodiments of the invention.

With reference to FIGS. 1, 2, 2A, and 2B there is shown a handcuff-like element 10 having an interior area 11, a cap 12, and a pair of generally rigid jaw members 14 and 16 each having a proximal hinge end 18, 20 and a distal attachment end 22, 24. Hinge ends 18, 20 are directly connected together and held by a screw 26 or a similar fastening device that may act as an axle. Additionally, or instead of the screw 26 acting as an axle, the inside cylindrical surface 28 and the outside cylindrical surface 30 along with appropriate snap fit confronting faces or shoulders, may create an accurate axle system. The axle system causes jaw members 14 and 16 to self align relative to one another when they are pivoted between the self sustaining wide open position (FIG. 2A) and the closed position shown in FIGS. 1 and 2C that encloses the interior area 11. Alternately, as illustrated in FIG. 9D below, a hinge strap, also known as a "living hinge" may be used in place of the axle system to similarly cause the jaws to self align when closed.

Cap 12 rests on shoulder 32 of jaw member 16 and is held in place by a pin 34 through holes as shown in cap 12 and jaw member 16, but cap 12 could be attached by other methods, for example gluing or ultrasonic welding. On each side face of the cap are apertures 36 that are in line with two release tabs 38 that will be described below.

The cap 12 creates a passageway 40 (FIG. 2B) having a retaining surface 42 for guiding the attachment end 22. Although jaws 14 and 16 are self aligning, and so retaining surface 42 is not required to guide attachment end 22 into a closed position, the retaining surface 42 aids in maintaining a latched condition by its close proximity to attachment end 22, so that retaining surface 42 opposes flexing of attachment end 22 outwardly, such as might occur under forces from a bundle retained by jaw 14. The "outwardly directed forces" would be most prevalent, for instance, if a person captured an oversized bundle of cord, preventing the device 10 from closing past just a few teeth of engagement, and thus the bundle exerts a force against the tooth portion of jaw 14 that may tend to open the jaws. The details of opening and closing of the jaws will be explained later. The outwardly directed forces would be a particular problem, if an oversized bundle were to receive an additive force such as by bumping or dropping of the bundle and device 10. This embodiment of the device 10 could function in most circumstances even if cap 12 were not present, although it may not remain latched as well under the situations just described.

Jaw member 14 has a generally smooth retaining surface 44 and fixed teeth 46 on the inner surfaces and an outer press area 48 on the outer surface. Although smooth surfaces are shown in the FIGS., it will be appreciated that teeth 46 or other non-smooth features may extend along all of jaw member 14, in other embodiments, such that there is not a smooth surface 44.

Jaw member 16 has a generally smooth retaining surface 50 near its hinge end, an outer press area 52 on the outer surface, and a pawl 54 on its attaching end 24. The pawl has deflecting teeth 56 and the horizontal release tabs 38 on each side. The fixed teeth 46 and the deflecting teeth 56 are sized to interlock. Both sets of teeth 46, 56 may be backward angled as seen most clearly in FIG. 2D, to enhance their ability to pass over each other in the closing direction, but resist movement in the opening direction. Although multiple teeth 56 are shown in the drawings, a single tooth may perform the desired function satisfactorily. As seen most clearly in FIG. 2D, the pawl is at the end of a resilient cantilever portion 58 so that downward force on the top surface of release tab 38, will cause the deflecting teeth 56 to move towards the interior of the device 10. It should be noted that there are two release tabs 38 but a force on just one of them will deflect the teeth inwardly.

Figure 2:
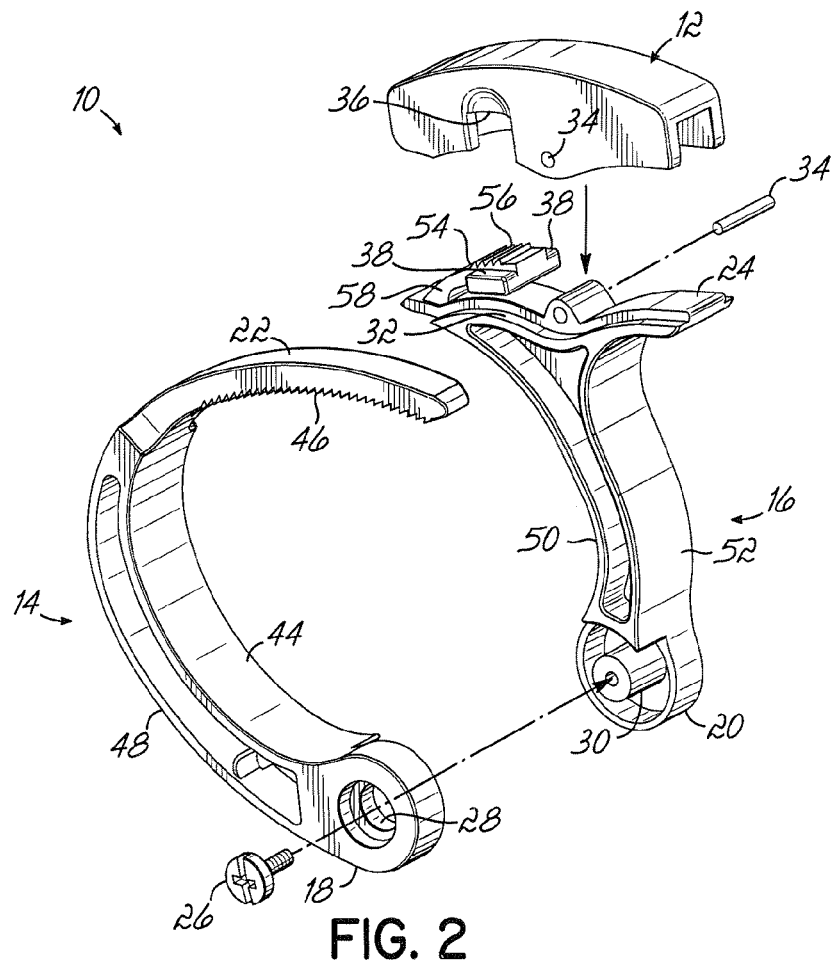
FIG. 2 is an exploded perspective view of the embodiment of FIG. 1.
Figure 2A:
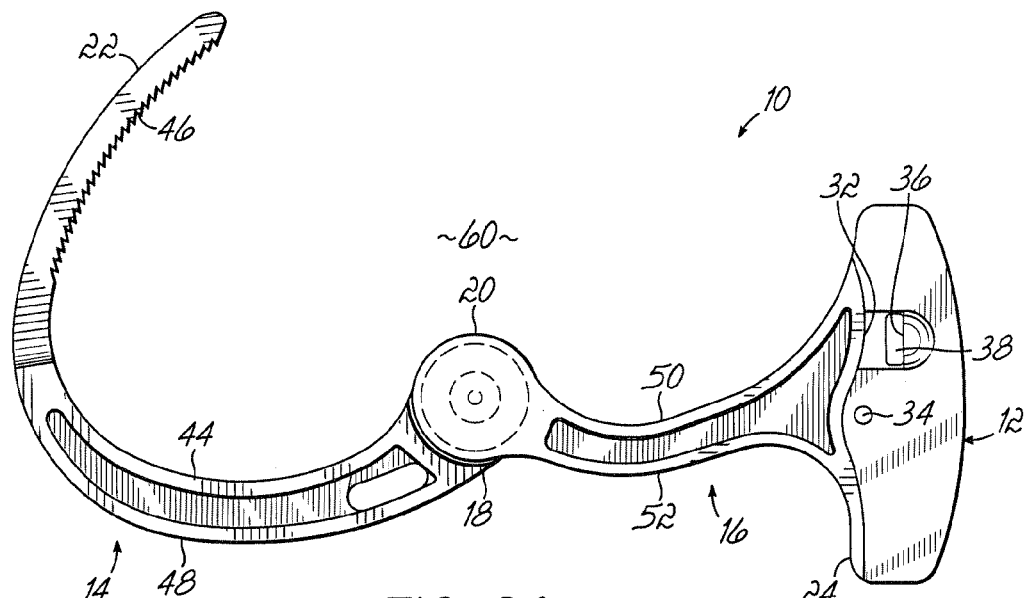
FIG. 2A is a side view, of the embodiment of FIG. 1 in an unlatched and open condition ready to receive a bundle.
Figure 2B:
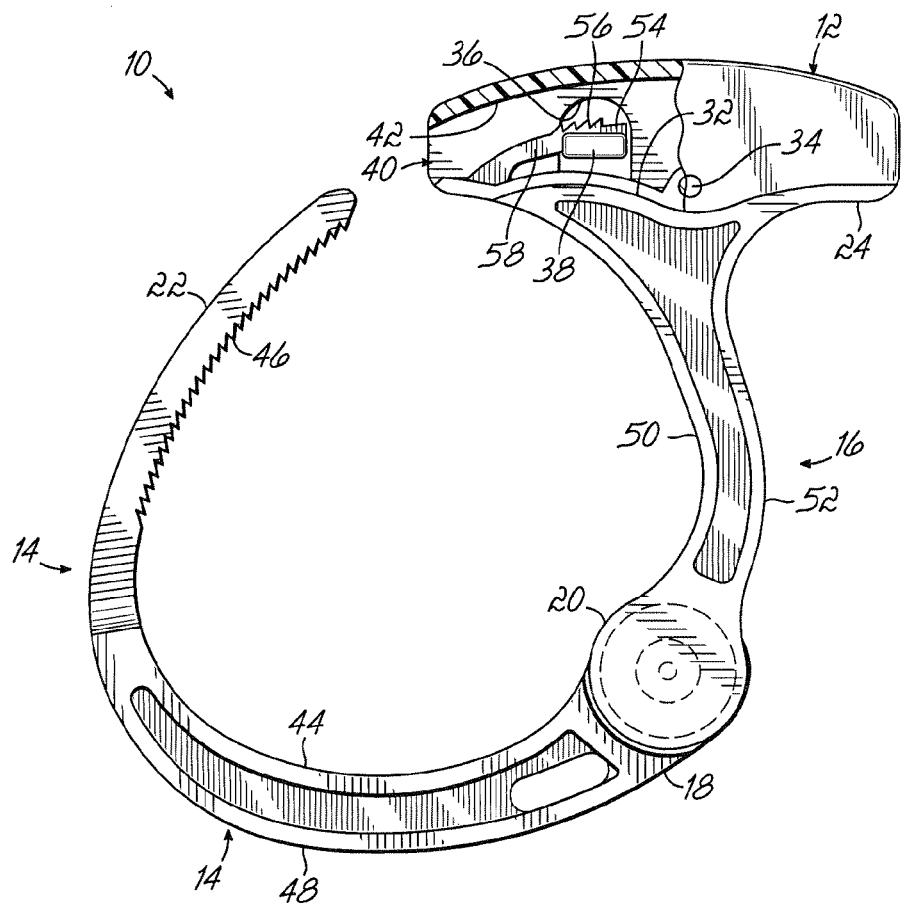
FIG. 2B is a side view with cutaway, of the embodiment of FIG. 1 in an unlatched and open condition.
Figure 2C:
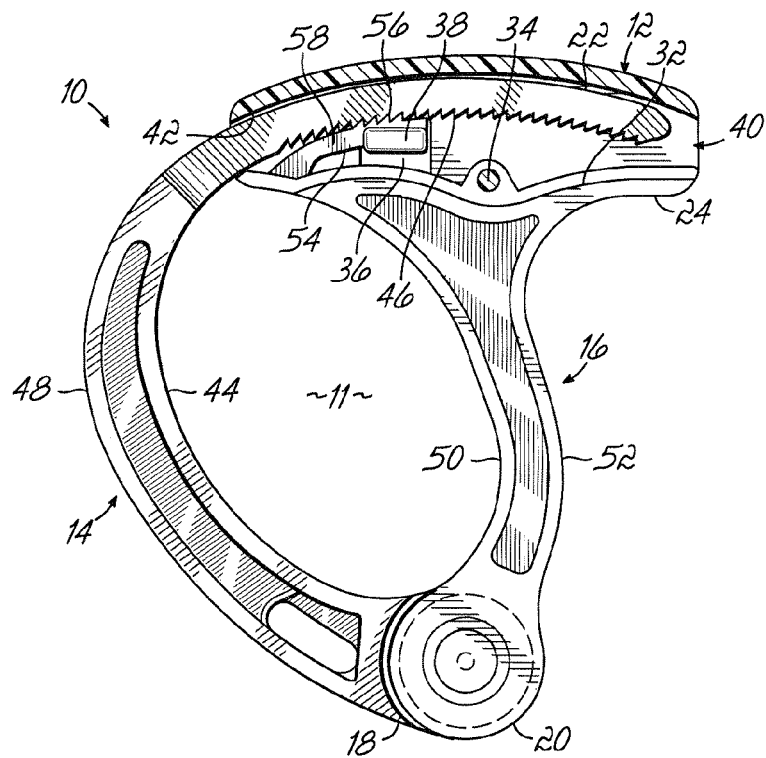
FIG. 2C is a side view with cutaway, of the embodiment of FIG. 1 in a latched condition.

In operation, as with some other handcuff like devices used for bundling, the device is put in the fully open position so that the retaining surfaces 44 and 50 define a bundle receiving space 60 (FIG. 2A). The device will remain in this position without any assistance, while the bundled item is placed in the space 60. Once the bundle is positioned, the user presses on outer press surfaces 48 and 52 to close the device. During the closing the attachment end 22 enters passageway 40 and the teeth 46 make contact with and pass over the teeth 56 (best seen in FIGS. 2C and 2D) while the pawl 54 flexes as teeth 46 pass over deflecting teeth 56.

Figure 2D:
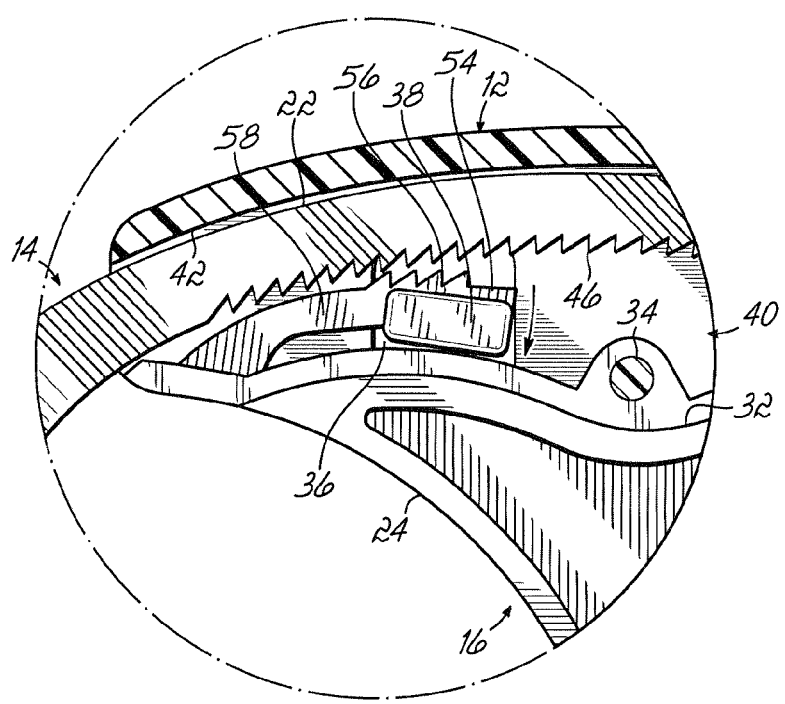
FIG. 2D is a detail cutaway of the embodiment of FIG. 2B at the beginning of the unlatching process.

FIG. 2D demonstrates the initiating actions to open the device. The exposed (as seen exposed in FIG. 1) release tab portion 38 is pushed in the direction indicated by the arrow toward the interior of the device, such as with a fingernail, so that the deflecting teeth 56 disengage from the fixed teeth 46 and then the jaw member 14 is removed from passageway 40 before the pressure is removed from tab 38. It is only necessary to use one of the two release tabs 38, thus, the device is operable even if access to one of the tabs is blocked, such as by a neighboring wall, a computer rack, or anything nearby.

Figure 3A:
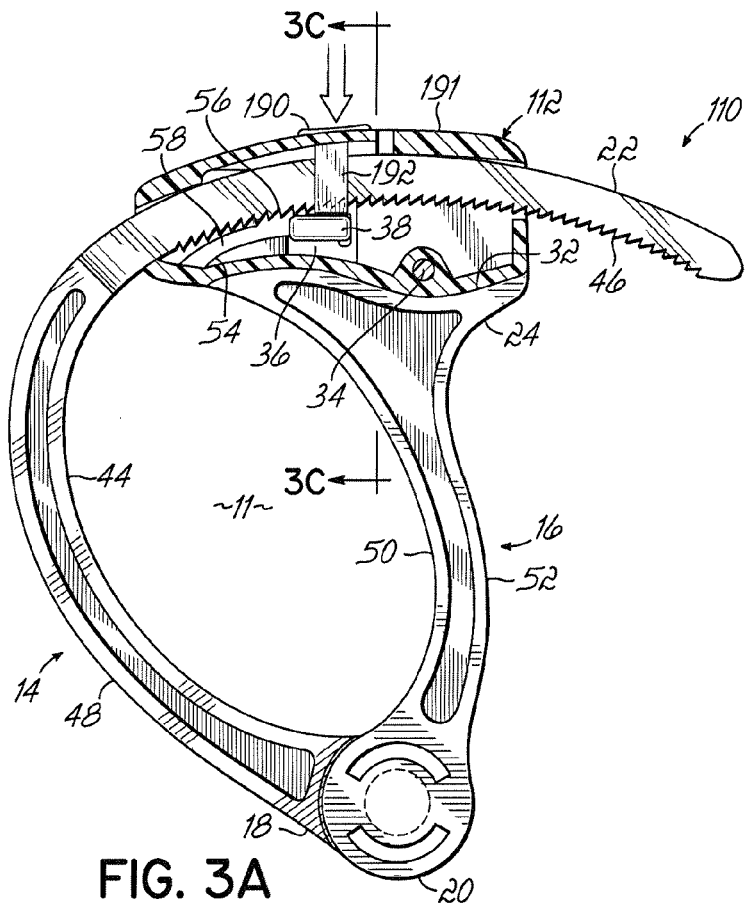
FIG. 3A is a side view with a cutaway, of an embodiment of the invention that is actuated by a central top button, shown in the latched condition.
Figure 3B:
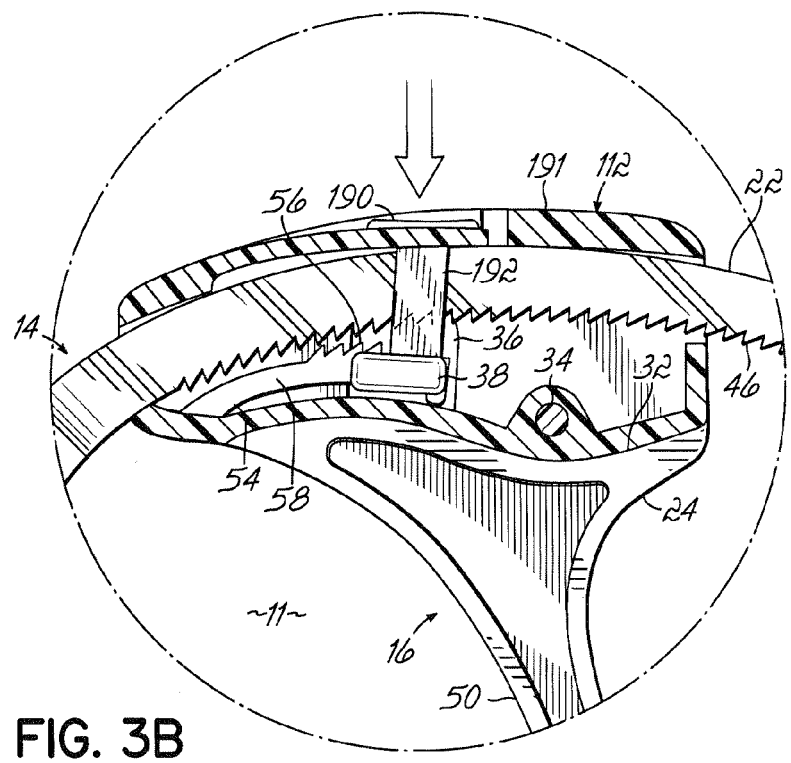
FIG. 3B is a detail side cutaway view of the embodiment of FIG. 3A at the beginning of the unlatching process.

The embodiment of a device 110 shown in FIGS. 3A and 3B may be built with all of the same parts as the previous embodiment, except for using a different cap. Whereas cap 12 of the previous figures allowed the device to open only through the use of the two release tabs 38, cap 112 of this embodiment additionally offers the user a button or spot 190 resiliently cantilevered as part of the cap's top surface 191. Inside of the cap (see FIGS. 3C, 3D and 3E), integral to the push button are two tabs 192 that pass near the inside wall of the cap 112, so that when the button 190 is depressed the two tabs 192 make contact with the two release tabs 38 resulting in the same releasing motion that would be provided by one or both release tabs being depressed directly.

FIG. 3A shows the device 110 in the latched condition with the teeth 56 on the pawl 54 in their raised position, interlocked with teeth 46. The button 190 is approximately flush with the top surface 191 of the cap 112. The arrow indicates the direction of movement to press button 190 to initiate unlatching.

FIG. 3B shows button 190 being pushed toward the interior of the device 110, and tabs 192 are in contact with release tabs 38. Pawl 54 is deflected toward the interior of the device under the pressure from tabs 192, which causes teeth 56 to move toward the interior of the device, and disengage from teeth 46 so that jaw member 14 can be removed from passageway 40 to complete unlatching.

Figure 3C:
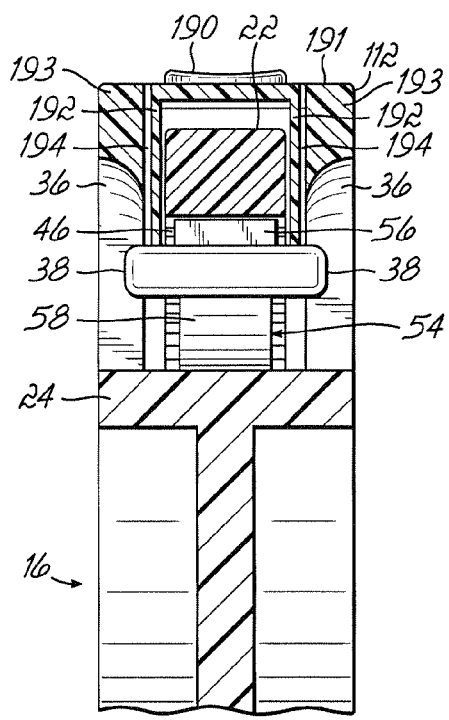
FIG. 3C is a cross sectional view of the embodiment of FIGS. 3A and 3B.

FIG. 3C is a cross sectional view of the device 110 of FIGS. 3A and 3B. It is latched as in FIG. 3A. This cross sectional view shows two tabs 192, apertures 36, and release tabs 38 whereas only one of each is visible in the preceding views. FIG. 3C also shows the relative thickness of the sidewalls 193 of cap 112, and the apertures 36 providing space for the release tabs 38. Spaces 194 between tabs 192 and the sidewalls of cap 112 are visible. Teeth 46 and 56 are interlocked since the clamp 10 is shown latched.

Figures 3D, 3E:
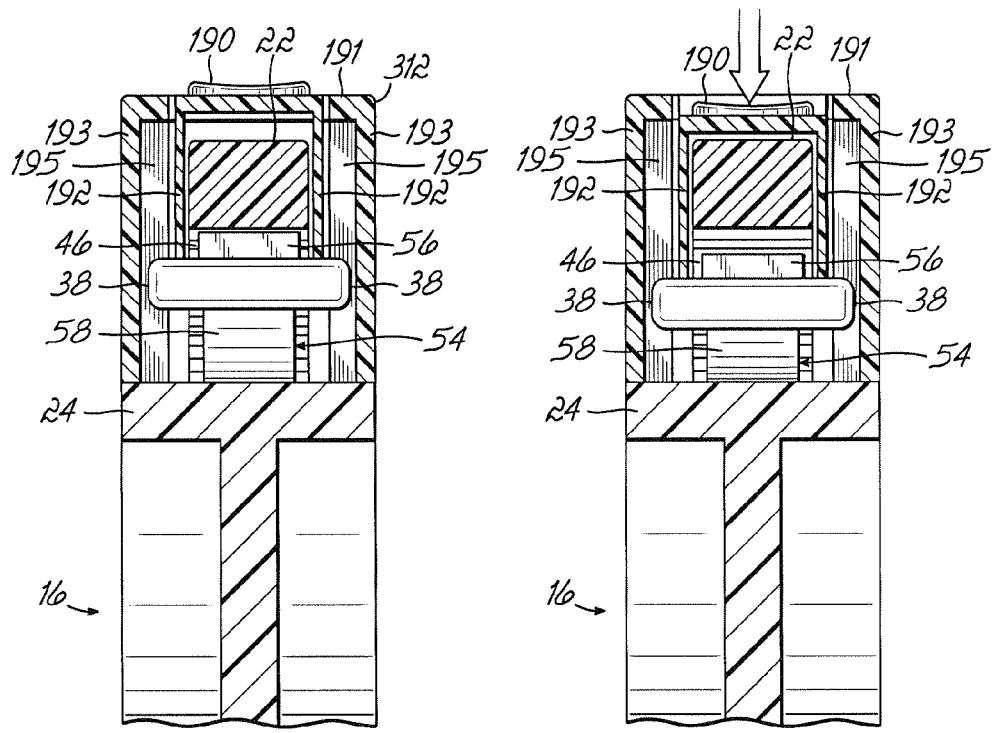
FIG. 3D is a cross sectional view similar to FIG. 3C showing an embodiment that does not have access to release tabs, in the latched condition.
FIG. 3E is a view of the embodiment of FIG. 3D, with the unlatching process having begun.

FIG. 3D is a cross sectional view similar to FIG. 3C but of an alternative embodiment. Again this figure shows the embodiment in a latched condition. In this embodiment there is a cap 312 that does not have any apertures 36 to provide access to release tabs 38, that is, cap 312 fully encloses release tabs 38. The only means provided for opening the device is the button or spot 190 on the cap's top surface 191. Release tabs 38 are accommodated inside cap 312 by two vertical channels 195 inside the cap 312 defined by reduced thickness of the sidewall 193 of the cap 312 in the area of the release tabs 38. Optionally, changes may also be made to reduce the extension of release tabs 38, since it is not necessary for a finger or fingernail to make contact with release tabs 38 in this embodiment, although changes to the extensions of release tabs 38 are not necessary if channels 195 are provided.

FIG. 3E illustrates the embodiment of FIG. 3D, with an arrow showing the directions the button 190 may be pushed to initiate unlatching. Pawl 54 has been deflected, and teeth 46 and 56 are disengaged so that the device can be opened in the same way as previously described for other embodiments.

Although this embodiment shows the pawl 54 being actuated by tabs 192 being contacted by tabs 192 integral with and approximately directly below button 190, other embodiments could be made that move the tabs 192 and button 190 to different positions. This change, however, may require that the embodiment of FIGS. 3D-3E would use different jaw members 16, unless jaw member 16 was made to accommodate multiple positions of tabs 192.

FIGS. 4, 5, 6A and 6B show another embodiment of device 210 that combines advantageous aspects from two previously described embodiments. The three digit numbers used in this embodiment with like ending digits designate similar elements as the numbers in the previous embodiments. This embodiment has two side pushbuttons 290 cantilevered in the side surface of cap 212 which are actuated for unlatching by pushing either one, or both, of the two available buttons on cap 212. Although the appearances of jaw members 214 and 216 look substantially different in this embodiment when compared to earlier figures having jaw members 14 and 16, many of the visual differences are a matter of styling or related to the fact that this embodiment shows how the device would look if it were sized for a small bundle, such as for a set of ear bud cables as used on small digital music devices that are currently common. Functionally, however, jaw member 214 remains the same, whereas jaw member 216 is changed to accommodate the two side buttons 290.

Figure 4:
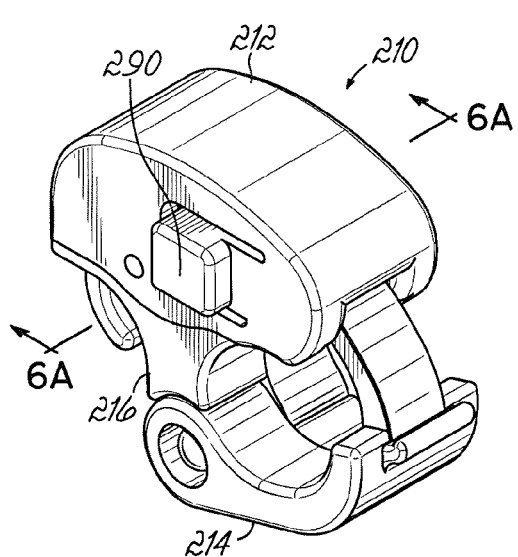
FIG. 4 is a perspective view of another embodiment of the invention in the latched condition. This embodiment has 2 side buttons.
Figure 5:
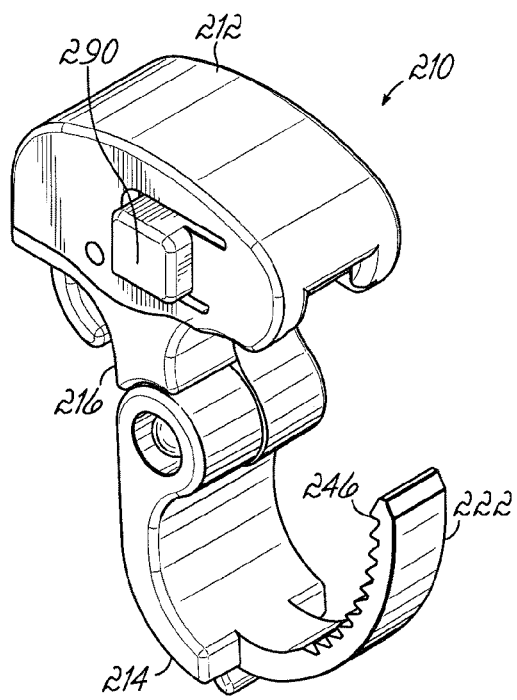
FIG. 5 is a perspective view of the embodiment of FIG. 4 in the unlatched condition.
Figure 6A:
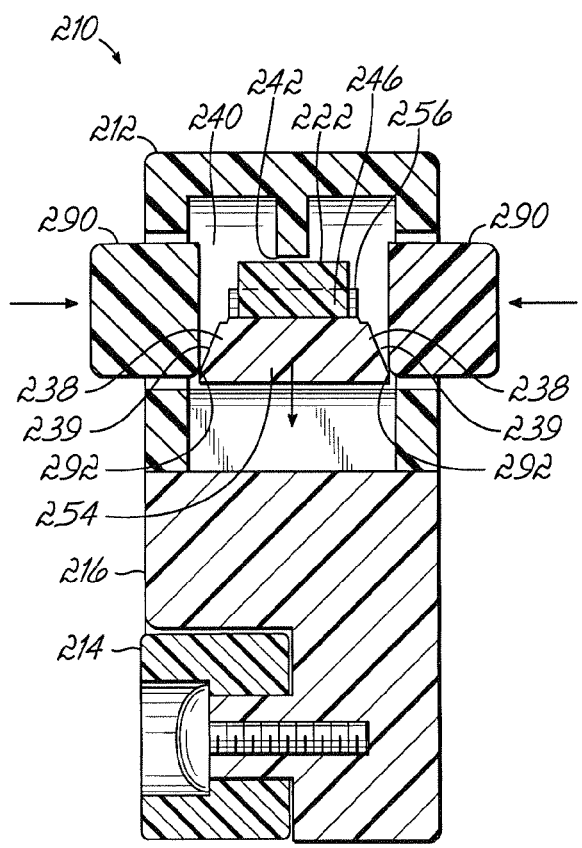
FIG. 6A is a cross section as indicated in FIG. 4, with arrows showing the direction of motion necessary to unlatch.

FIG. 6A is a cross section showing the device 212 in the latched position, analogous with FIG. 4. Cap 212 defines a passageway 240 that defines on its surface a retaining surface 242. Jaw member 214 has attaching end 222 and teeth 246. Jaw member 216 has pawl 254, deflecting teeth 256, and tabs 238. Teeth 246 are interlocked with teeth 256. Tabs 238 do not have a top face as did release tabs 38, but instead have angled side faces 239. The reason for these angled side faces can best be understood by describing the unlatching actuation as follows.

Two arrows in FIG. 6A show the buttons 290 being depressed towards the pawl 254 so that the device will unlatch. The lower inner corner 292 of either or both of buttons 290 makes contact with angled surface 239, causing pawl 254 to deflect toward the interior of the device as indicated by the arrow.

Figure 6B:
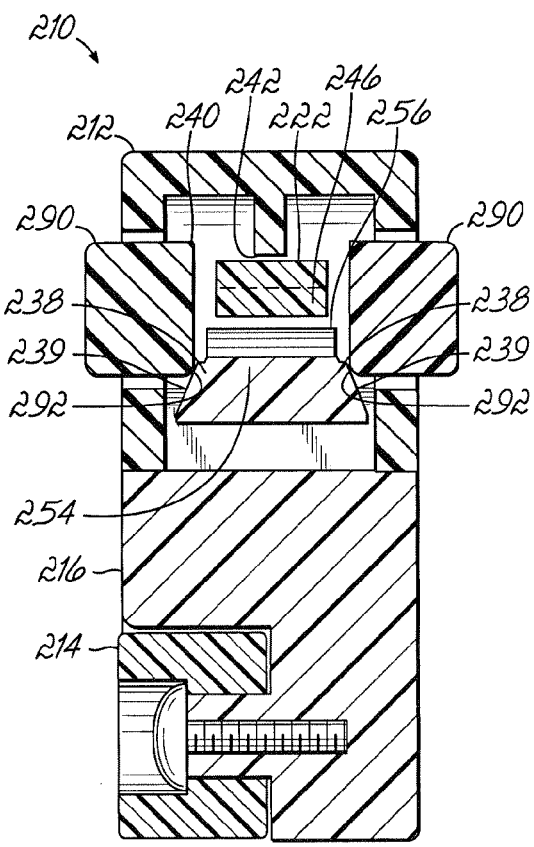
FIG. 6B is the cross section of FIG. 6A after the initial movement for unlatching, as indicated in FIG. 6A, has taken place.

FIG. 6B shows the same cross section as FIG. 6A with the following differences: Buttons 290 have moved towards each other and the pawl 254 and deflecting teeth 256 have moved inwardly and disengaged from teeth 246. The device is ready to be opened by moving the jaw member 214 out of the passageway 240.

Figure 7:
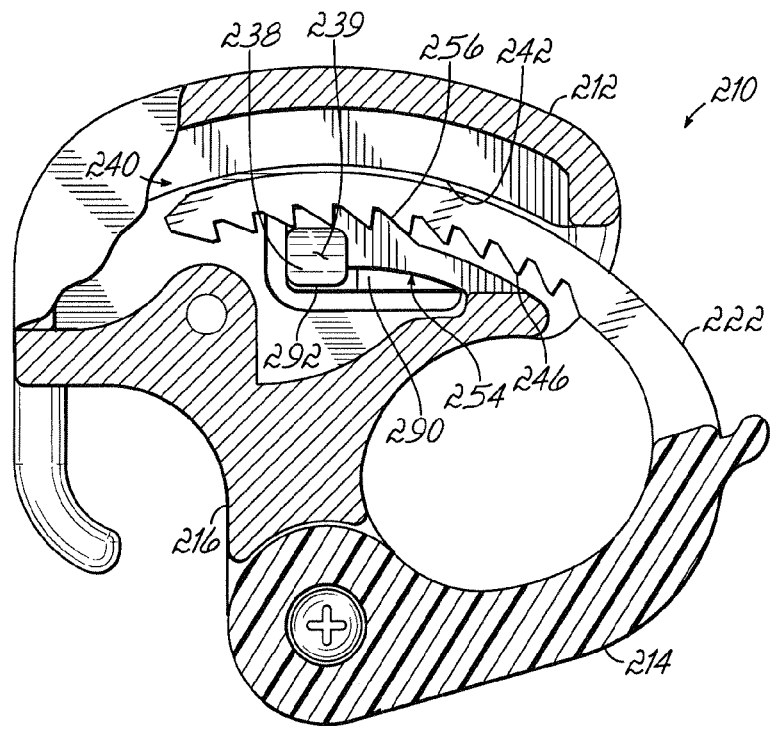
FIG. 7 is an elevational side cut away view of the embodiment of FIG. 4.

FIG. 7 is shows a side partial sectional view of the device 210 in the latched position.

Figure 8A:
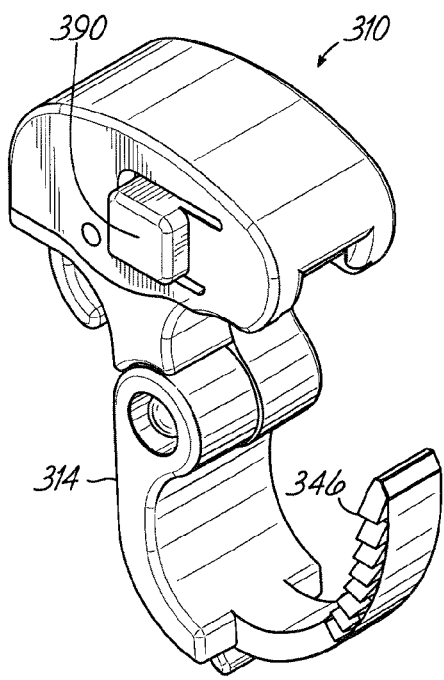
FIG. 8A is a perspective view of an embodiment having side teeth.

FIG. 8A shows yet another embodiment of the invention. A device 310 is shown having a jaw member 314 that has teeth 346 that are disposed on the side of the jaw member rather than on the inward surface as in the other embodiments. A side button 390 is pushed to begin unlatching the device, using internal structures such as those shown in FIGS. 3D and 3E.

Figure 8B:
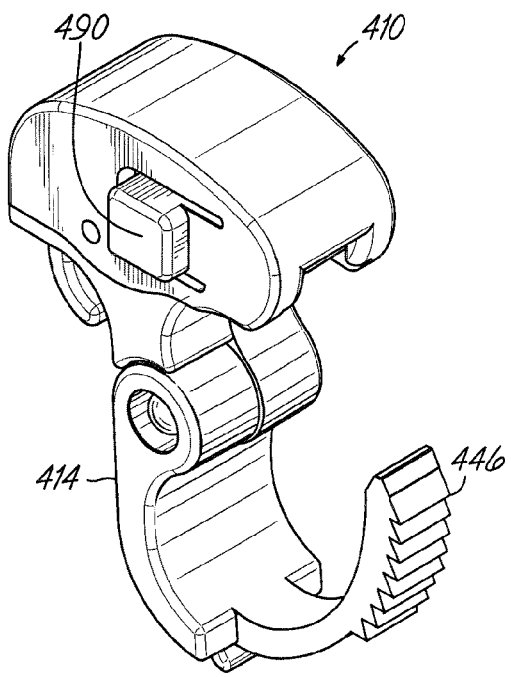
FIG. 8B is a perspective view of an embodiment having outside teeth.

FIG. 8B shows yet another embodiment of the invention. A device 410 is shown having a jaw member 414 that has teeth 446 that are disposed on the outside of the jaw member rather than on the inward surface as in the other embodiments. A side button 490 is pushed to begin unlatching the device, using internal structures such as those shown in FIGS. 6A and 6B.

FIG. 9A shows an embodiment of a size similar to that of FIG. 4, but using two side buttons such as those in the embodiment of FIGS. 4, 5, 6A, 6B and 7. A frame 294 has been added to so that a person's fingers could pass through or grip the open area 296 and frame 294 to provide an easy way for a person to carry device 210 and its contents. Frame 294 could be roughened or knurled to assist in gripping. A handle such as the one formed by frame 294 is especially convenient when the size of the device 210 is small, in which case grasping the combination of the device and a bundle could result in accidentally depressing a button 290, causing the device 210 to unlatch. The frame 294 and open area 296 also forms a convenient way to hang a bundle and device combination. For instance, a coiled extension cord, captured by the device 210, could be hung on peg on a garage wall by passing open area 296 over the peg.

FIG. 9B shows an embodiment with two side buttons as in FIG. 9A, in which, instead of a frame 294 creating an open space 296, a gripping wall 298 is provided. Wall 298 may be knurled or roughened to facilitate gripping.

FIG. 9B further illustrates optional wedges 300a, 300b and 300c incorporated into wall 298, used for mounting the device. Wedges may mount the device onto the object to be bundled (such as a headphone or extension cord) or to another cylindrically-shaped item such as a peg in a pegboard. The device may incorporate wedge structures of varying sizes thus allowing the user to select the wedge 300a, 300b, 300c that is sized to accommodate the particular size of cord or tubular structure to attach to the device. The use and operation of wedge structures is disclosed in detail in U.S. Pat. No. 5,774,945, which is hereby incorporated herein in its entirety. By selecting a wedge 300a, 300b, 300c that is slightly smaller than the cord or tubular structure, sufficient friction may be generated to prevent the cord or tubular structure from sliding in the wedge. On the other hand, if such sliding is desired, a wedge that is slightly larger than the cord or tubular structure may be selected.

FIG. 9C shows an embodiment as in FIG. 9A or 9B except that in this case there are two optional walls rather than just one as shown in FIG. 9B. The necessary internal workings for the two buttons are situated between the two walls. The two walls may define therein various wedges such as 300d and 300e illustrated in FIG. 9C. One way of constructing this embodiment is for the jaw member 216 to be able to accommodate a bigger cap 412. The internal workings can include structures extending from the buttons that reach to the pawl, or the pawl can be made larger to extend to the buttons.

FIG. 9D shows a further alternate embodiment 510 having jaw members 514, 516 that are integrally joined by a hinge strap or "living hinge" 526. This integral resilient hinge 526 performs the same alignment function as the screw 26 or cylindrical portion 30 disclosed in the embodiments of earlier figures. The contour at 526 can be of many shapes, and it is a function of the materials, thicknesses and curvatures used for a particular design of clamp 510. Although this hinge strap is only shown in this FIG. 9D, the concept can be used for any of the device embodiments shown.

FIG. 10 shows a method of use for any one of the embodiments such as device 10. Any one of the embodiments can be provided with one or more hooks 62 that could be of a variety of shapes and at a variety of locations either in the interior 11 of elsewhere on the device. This hook could either removably, or permanently, attach the device 10 to an object 64 suitable for bundling. Other embodiments might use a wedge as described above to grip the cord being bundled, or other parts of the object 64. The object 64 shown in FIG. 10 is a set of ear buds and attached cords, as typically used for listening to music from portable audio devices.

FIG. 11 shows another example of an environment of use similar to that shown in FIG. 10. In this example the object 64 is an electrical device, such as a power drill, blow dryer, or extension cord. Any corded device or other device in need of bundling (such as a piece of rope) could be bundled in the manner shown in this drawing.

Figure 12:
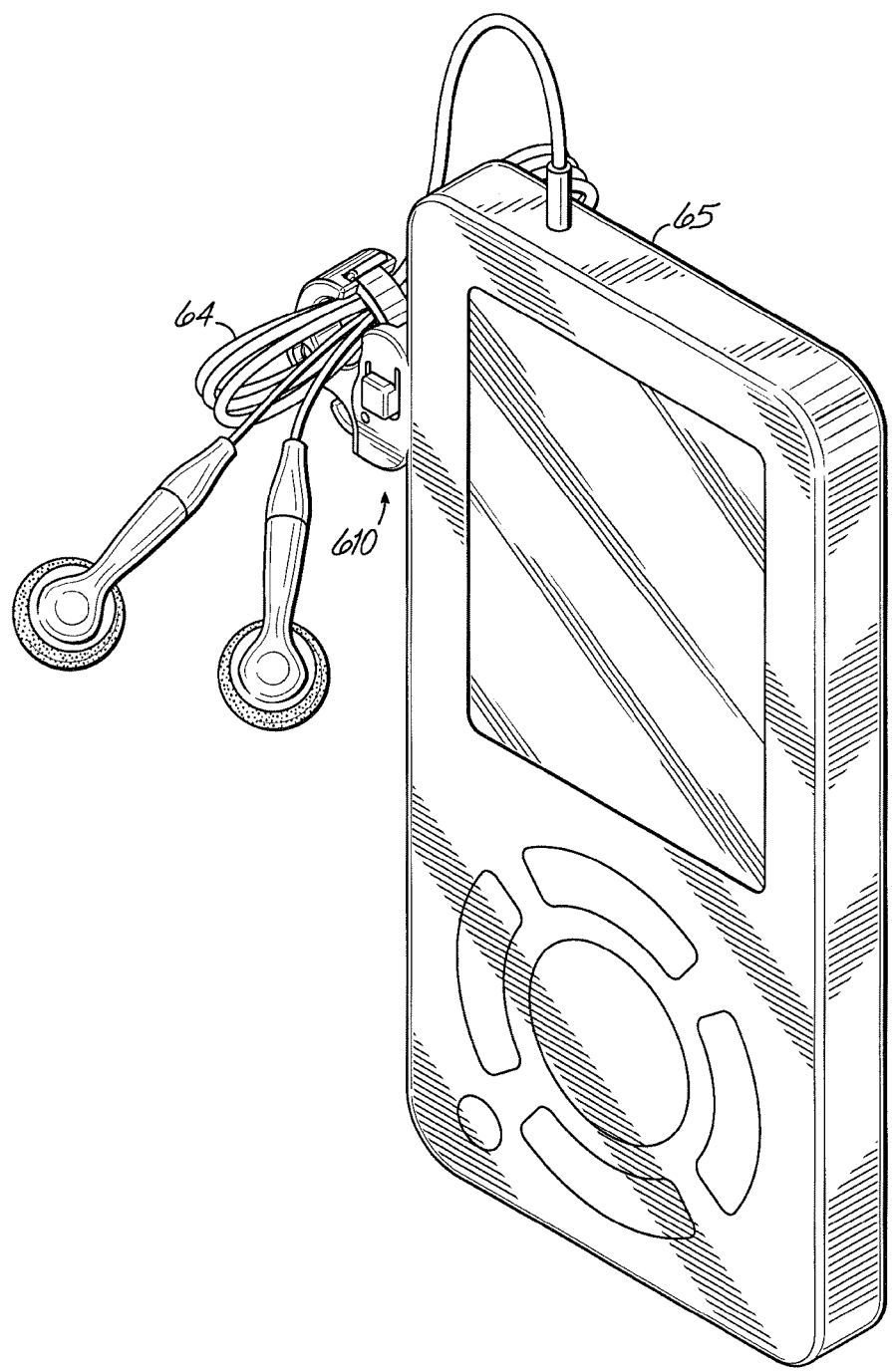
FIGS. 12 and 12A are views of two embodiments that are integrated with a consumer device.

FIG. 12 shows an example of a device 610 permanently or removably attached to an object 65 that uses a cord 64 needing bundling. In this embodiment the device 610 is attached to the object 65 rather than to the cord 64 that needs bundling.

Figure 12A:
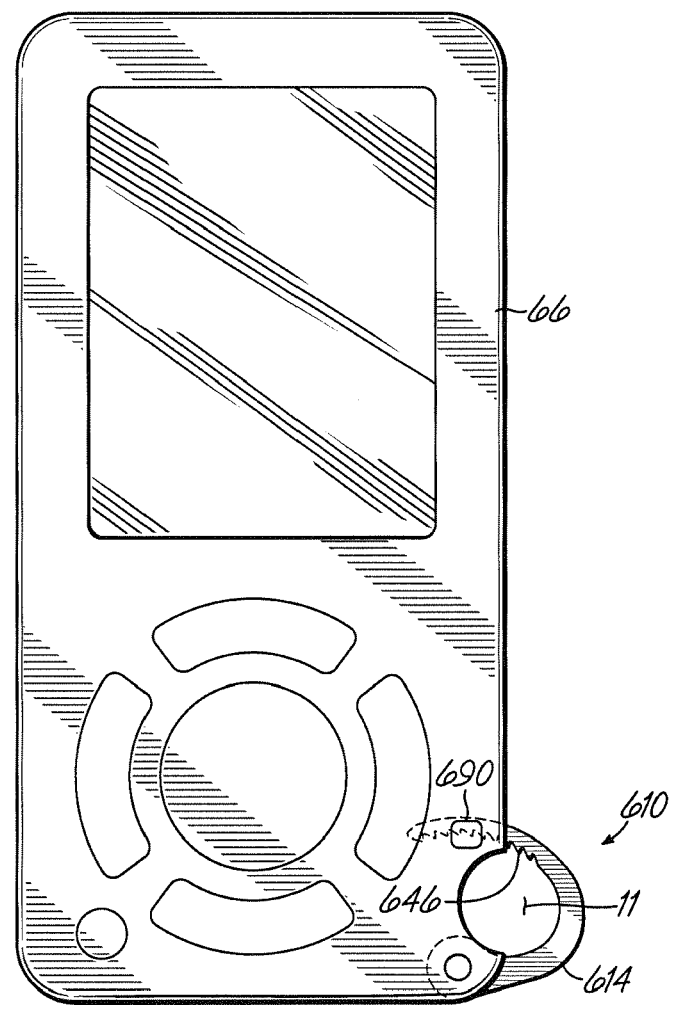

FIG. 12A shows a further embodiment, in which an object 66 incorporates into its structure, a device 610 utilizing principles previously illustrated. Specifically, the device 610 creates a space 11 in which, for example, a cord 64 may be bundled. Whereas in previous embodiments, for example the embodiment 210 (FIG. 12) included two jaw members such as 214 and 216, in the present embodiment, only one jaw member 614 may be included. The functional portions, such as the pawl 54 and moving teeth 56 of the jaw member 216 shown in previous embodiments, are incorporated within the body of the object 66. Button 690 is outwardly visible and leads to internal moving parts controlling pawl 54 as discussed with reference to prior embodiments. In FIG. 12A, jaw member 614 has fixed teeth 646 on the inner surface, and button 690 moves a pawl into and out of engagement with teeth 646, similar to button 290 of previous figures. Alternatively, a button such as 190 of FIG. 3A may be used along with side teeth (such as 346 in FIG. 8A). Similarly, teeth on the outer surface of jaw 614 (such as teeth 446 in FIG. 8B) could be used on jaw member 614, with appropriate arrangement of a pawl to interlock with those teeth.

Although FIGS. 12 and 12A shown a portable music player that does not have a protective carrying case, in many examples of these portable players, the user may elect to use an exterior case surrounding the device for decorative and/or protective reasons. The principles of this invention, shown in FIGS. 12 and 12A, may be applied to a carrying case as readily as to the object itself; that is, the device 210 may be attached to a case and/or a device 610 may be integrated into a case.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the general inventive concept.

What is claimed is:

1. A device for handling or storing one or more items, comprising:

a pair of generally rigid jaw members each having a hinge end and an outer end, each jaw member including an inner surface and an outer surface, the jaw members being connected together at their hinge ends, such that the jaw members (i) have a first, open position in which the outer ends are spaced apart to define a receiving space and the inner surfaces are spaced apart, (ii) have a plurality of second, closed positions in which the outer ends are nearer to one another, and (iii) are self aligned such that the outer ends automatically engage one another upon applying pressure upon an outer surface, wherein
a first jaw member incorporates an engagement area on its inner surface, and a second jaw member incorporates an engagement device for engaging said engagement area, a portion of the engagement device extending from a body of the second jaw member, the engagement device being releasable by movement of said portion toward the body of the second jaw member in a direction substantially perpendicular to the direction from the engagement device to the hinge ends of the jaw.

2. The device of claim 1 wherein the engagement area of said first jaw member incorporates a plurality of teeth.

3. The device of claim 1 wherein the engagement device of said second jaw member comprises a latch member having at least one tooth for engaging said engaging surface of said first jaw member.

4. The device of claim 3 wherein the latch member comprises a plurality of teeth for engaging said inner surface of said first jaw member.

5. The device of claim 1 wherein the engagement device comprises a movable member, the movable member positioned relative to a said outer surface and including a cam for engaging and moving an internal member of said engagement device.

6. The device of claim 1 wherein an outer press surface of one said jaw member includes a handle portion extending from said jaw member.

7. The device of claim 6 wherein said handle portion comprises a loop extending from said jaw member and defining an aperture therethrough.

8. The device of claim 6 wherein said handle portion is incorporated within the second jaw member.

9. The device of claim 6 wherein said handle portion is incorporated within the first jaw member.

10. The device of claim 1 wherein an outer surface of one said jaw member includes a hook portion.

11. The device of claim 10 wherein said hook member is sized to engage an item inserted between said jaw members.

12. The device of claim 10 wherein said hook portion is V-shaped.

13. The device of claim 10 wherein said hook portion is C-shaped.

14. The device of claim 1 wherein the jaw members are integrally connected by a hinge strap.

\* \* \* \* \*